United States Patent Office.

EDOUARD WENGER, OF RICHMOND, INDIANA, ASSIGNOR TO HIMSELF AND JOSEPH MARTISCHANG.

Letters Patent No. 81,564, dated August 25, 1868.

COMPOSITION FOR PAVEMENT.

The Schedule referred to in these Letters Patent and making part of the same.

TO ALL WHOM IT MAY CONCERN:

Be it known that I, EDOUARD WENGER, of the city of Richmond, county of Wayne, and State of Indiana, have invented a new and useful Composition for Pavements; and I do hereby declare that the following is a full, clear, and exact description of the manner of making and compounding the same, which I call my "Asphaltic Composition for Pavements."

To enable others skilled in the arts to make my asphaltic composition, I will proceed to describe the manner of making and compounding the same, it being composed of prepared coal-tar, one part; sifted sand, one part; burnt clay, one part, (clay-stone.)

The tar should be prepared by boiling from seven to eleven hours. A good quality of tar will not require boiling more than seven or eight hours, and should be done in a covered vessel, (luted,) with a pipe attached, communicating with the inside. Said pipe should pass through cold water or humid sand. The steam escaping through the said pipe will, on cooling, produce benzine.

To ascertain whether the tar is sufficiently boiled, the cover of the vessel should be removed, and one end of a crooked pipe should be inserted in the boiling tar. As soon as water is seen coming out of the other end of the pipe the tar is ready for use; on the contrary, if oil should come out, the boiling has to be continued.

When the tar is thus prepared, it should be mixed with an equal quantity of burnt clay, and be set on dry sand for cooling, and be cut in pieces, for the fabrication of the asphalt.

Before the mixture of the three parts mentioned above, the tar and clay thus prepared should again be brought to a boiling heat, when the sand should be added, and also the clay-stone.

The compound should be immediately applied on a foundation made of gravel and lime, of a suitable thickness, say two inches or more, according to the quality of the earth upon which it is laid.

The asphaltic compound should not be less than three-eighths or half an inch thick, or more, which may be made in proportion to the service required, or may be one inch thick, or more, if desired.

I do not claim the use of asphaltum or coal-tar, mixed with burnt brick-clay or vitrified sand, as that has before been used; but What I do claim as my invention, and desire to secure by Letters Patent, is—

1. Compounding an asphaltic composition with the materials above described, in the manner and with the proportions set forth.

2. Laying the same on a foundation of gravel and lime.

EDOUARD WENGER.

Witnesses:
    T. A. DUGDALE,
    ENOS THOMAS.